May 19, 1953   E. S. GRUMBACHE   2,639,187
TRUCK BODY PLATFORM
Filed June 19, 1947   3 Sheets-Sheet 1

INVENTOR.
Edward S. Grumbache
BY
Morgan, Finnegan & Durham
ATTORNEYS.

May 19, 1953
E. S. GRUMBACHE
2,639,187
TRUCK BODY PLATFORM
Filed June 19, 1947
3 Sheets-Sheet 2
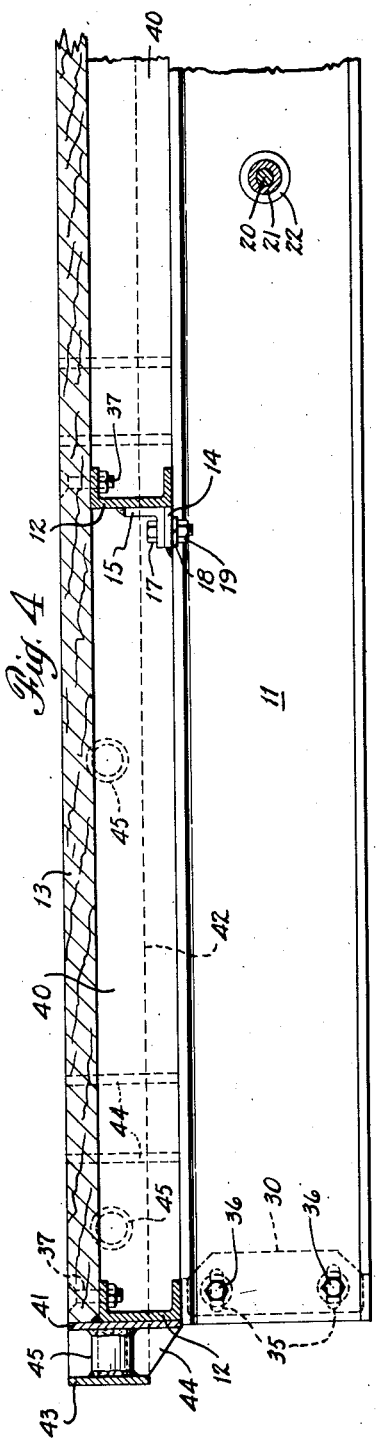
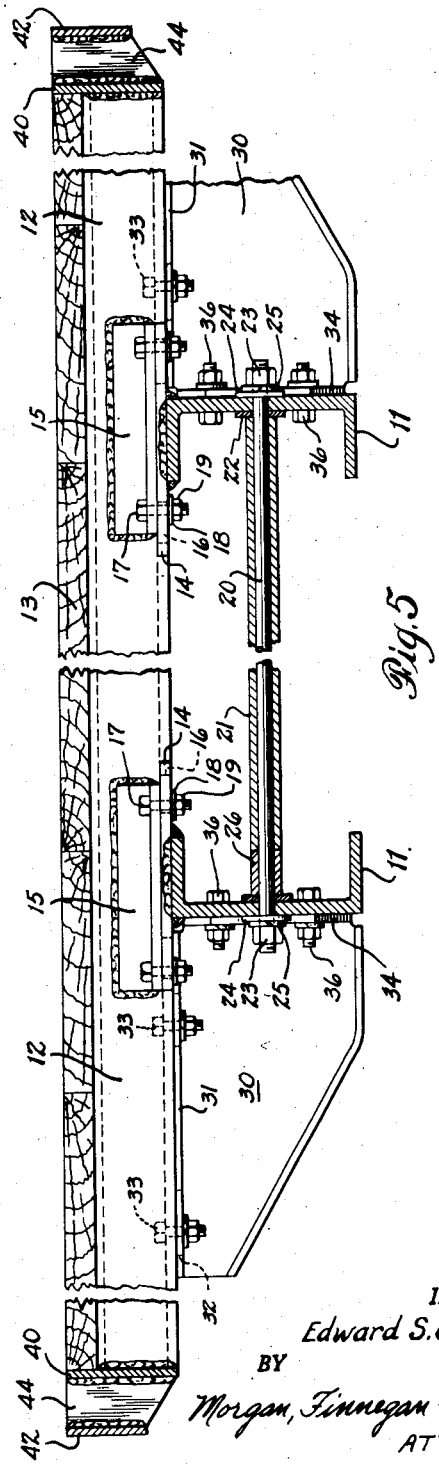
INVENTOR.
Edward S. Grumbache,
BY
Morgan, Finnegan & Durham
ATTORNEYS

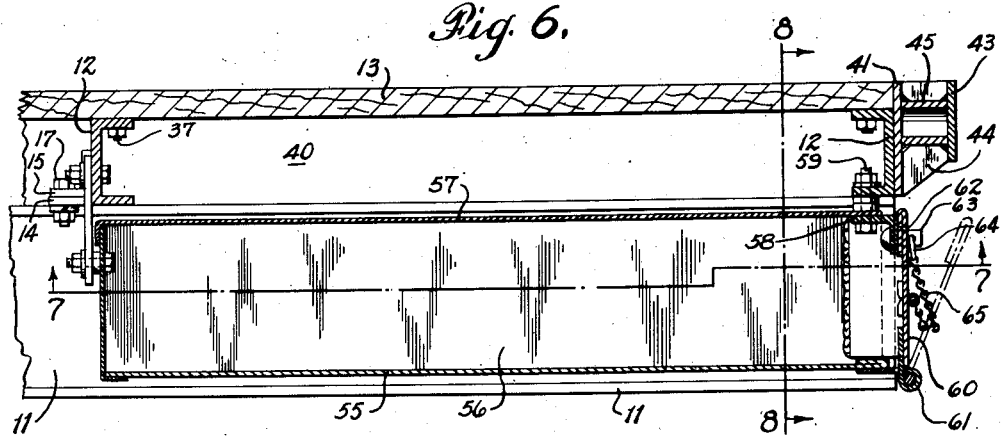
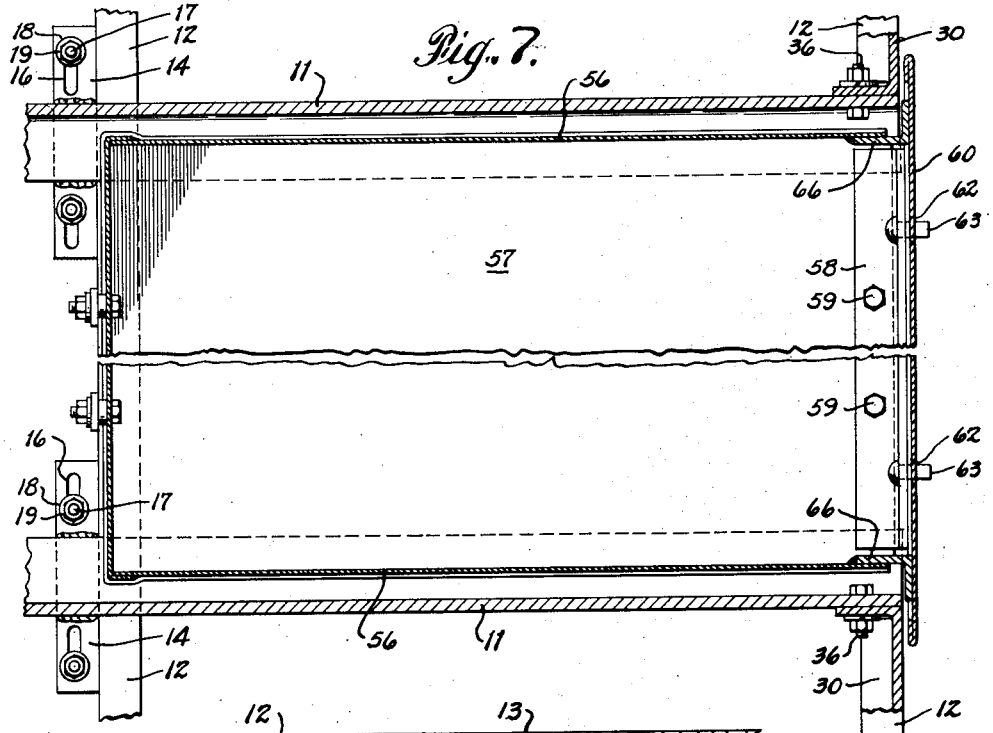
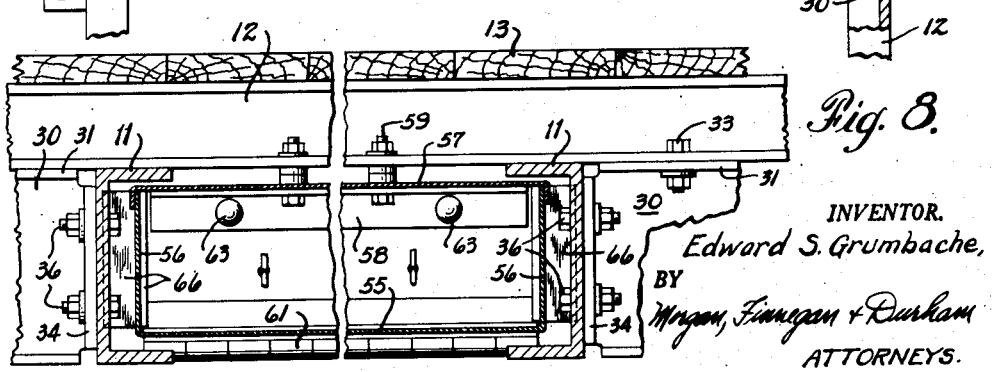

Patented May 19, 1953

2,639,187

UNITED STATES PATENT OFFICE 2,639,187

TRUCK BODY PLATFORM

Edward S. Grumbache, Paris, Ill., assignor to Electrographic Corporation, New York, N. Y., a corporation of Delaware Application June 19, 1947, Serial No. 755,593

2 Claims. (Cl. 296—37)

The present invention relates to improvements in truck body platforms.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 4 is a cross-sectional view taken along line 4—4 of Fig. 2;

Fig. 5 is a cross-sectional view taken along line 5—5 of Fig. 2;

Fig. 6 is a cross-sectional view of the tool compartment taken along line 6—6 of Fig. 2;

Fig. 7 is a cross-sectional view taken along line 7—7 of Fig. 6; and,

Fig. 8 is a fragmentary cross-sectional view taken along line 8—8 of Fig. 6.

The present invention has for an object the provision of a strongly constructed and efficient truck body platform with adjustable features making it easily adaptable to various sizes of truck chassis and combined with a tool compartment at the rear of the platform which presents no interference with the adjustable sill construction and appears to fill the complete space therebetween.

Figure 1:
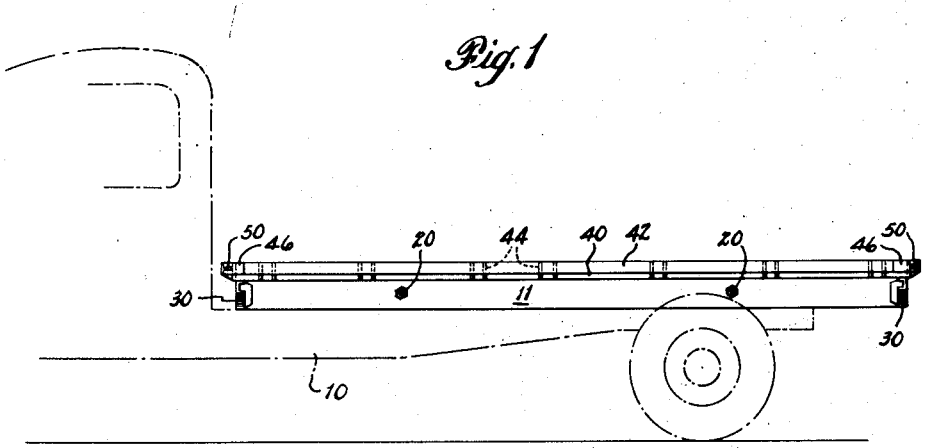
Fig. 1 is a side elevation of a typical and illustrative embodiment of the truck body platform of the invention shown in its relationship with a truck chassis shown in dot-dash lines.
Figure 2:
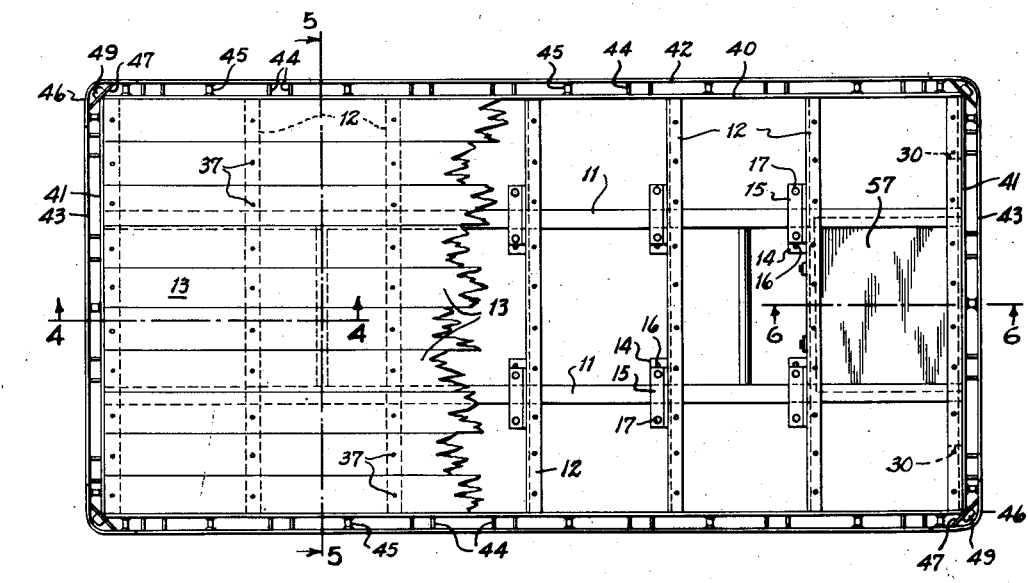
Fig. 2 is a top plan view of the platform shown in Fig. 1, certain parts being broken away for greater clarity.

Referring now in detail to the illustrative embodiment of the invention shown by way of example in the accompanying drawings, the truck body platform is shown in Fig. 1 as mounted on the chassis 10 of the truck, to be held thereon by any suitable and conventional means such as holding brackets or hangers (not shown). The platform comprises a pair of longitudinally extending subsills 11 preferably made of steel beams having a U cross-section as clearly shown in Fig. 5 of the drawings. A plurality of cross-bolsters 12 are provided spaced apart longitudinally of the sills 11 and supported on the upper surfaces thereof. The bolsters 12 are likewise preferably formed of steel beams having U cross-sections, as may be seen in Fig. 4 of the drawings, and are adapted to support on their upper surfaces the longitudinally extending wood flooring beams 13 serving as the bed of the truck.

The bolsters 12 are so arranged and secured to the sills 11 that the latter may be readily moved closer to or farther away from each other in adapting the platform for attachment to truck chassis of various sizes. As shown, such mounting and securing means comprise a plurality of flat plates which are securely welded to the upper surfaces of sills 11 transversely thereof and are spaced apart therealong at positions where bolsters 12 are to be mounted. The bolsters are provided with L shaped brackets 15 welded thereto on their outwardly presented vertical surfaces, and the lower surfaces of the brackets are adapted to seat on plates 14. Slotted apertures 16 are provided through plates 14, and suitable apertures are also provided in brackets 15 to receive mounting bolts 17. Lock washers 18 and nuts 19 cooperate to securely hold the bolsters in place on the sills. The latter may be adjusted with respect to each other by loosening the bolts and moving the sills to the extent permitted by slotted apertures 16.

As best shown in Fig. 5, the platform is reinforced and held in adjusted assembled relationship by means of a pair of rods 20 which extend through apertures provided in the vertical walls of sills 11. A tubular spacing member 21 surrounds each rod 20 to abut, through interposed washers 22, the facing sill walls, and nuts 23, washers 24 and lock washers 25 securely hold the sills against the spacing members 21. A shorter spacing member 26 may be positioned additionally over each rod 20 when the sills 11 are to be spaced further from each other to fit a wider truck chassis, and the sub sills will then be suitably braced and held as shown in Fig. 5.

Figure 3:
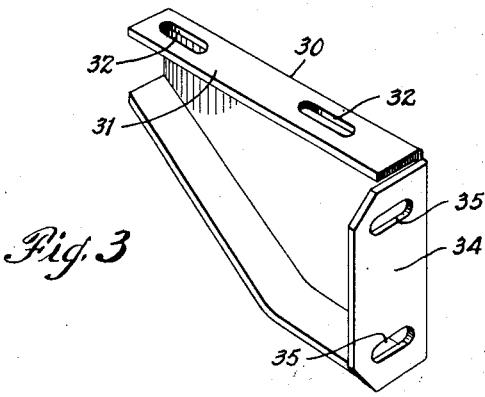
Fig. 3 is a perspective view of one of the lateral braces in the platform shown in the drawings.

The lateral braces 30 for the platform are shown in detail in Fig. 3 of the drawings and are preferably of the strong angled steel formation shown. One of the braces 30 is positioned at each corner of the platform extending from a sill 11 toward the edge of the platform along a bolster 12. The horizontal upper web 31 of each brace 30 is provided with slotted apertures 32 to receive bolts 33 extending through the lower web of a bolster 12, whereby the braces are adjustably secured to the bolsters. The vertical web 34 of each lateral brace is provided with slotted apertures 35 to receive bolts 36 extending through the vertical walls of sills 11, thus securing the braces to the sills and allowing adjustment so that the apertures 32 may be readily registered to receive bolts 33.

The beams 13 are securely held in place by bolts 37 which extend through them and the upper horizontal webs of bolsters 12.

The rub rail construction for the platform of the invention comprises a pair of longitudinally extending rail members 40 one extending along either side of the platform and welded to the ends of bolsters 12. A pair of other rail members 41 are provided one at the front and one at the rear of the platform, the rails serving as cross members between rails 40 and being welded at their ends thereto. An outer longitudinal rail member 42 is provided adjacent each rail 40, and similarly outer end rail members 43 are provided for lateral rails 41. The corresponding pairs of rails 40—42 and 41—43 are held together by transversely positioned webs 44 welded at their ends to said rails and so positioned as to form stake pockets for the platform. Cylindrical connecting members 45 are also positioned between parallel rails and welded to each, and are spaced about the rub rail structure to provide tying places for cables, ropes and the like.

A tool compartment is provided at the rear of the platform and, as shown, comprises an integral member turned to provide a bottom 55 and sides 56 with a top member 57 having turned edges lapping the upper edges of sides 56 and welded thereto. A laterally extending attaching plate 58 of L cross-section is welded to the rear edge of top member 57, and the tool compartment is securely held to the rearmost bolster 12 by means of bolts 59 extending through the top and plate member 58. The tool compartment is also supported from the second rearmost bolster as shown in detail in Fig. 6.

The plate described extends downwardly somewhat into the open end of the tool compartment to serve as an attaching flange for a door 60 which is mounted on the bottom 55 by means of a hinge 61. The door is provided at its upper edge with apertures 62 to receive lugs 63 welded to plate 58, the lugs being suitably apertured to receive hooks 64 on chains 65 secured to the door.

The door 60 is made of a length to at least cover off the distance between sills 11 at their widest adjusted position and thus is substantially wider than the distance between the sides 56 of the compartment, which are close enough together not to interfere with the closest adjustment of sills 11. A plate 66 of L cross-section is welded to either side 56 of the compartment presenting outwardly laterally extending flange portions against which the door 60 may abut when closed for greater stability. It will be noted that the compartment is securely held to a platform bolster between the sills 11, and is of such dimensions that it will not interfere with sill adjustment, while presenting at all times the appearance of completely filling the space between the sills.

The invention in its broader aspects is not limited to the specific mechanisms shown and described but departures may be made therefrom, within the scope of the accompanying claims, without departing from the principles of the invention and without sacrificing its chief advantages.

What I claim is:

1. A truck body platform comprising, in combination, a pair of longitudinally extending sill members, a plurality of transversely extending bolster members, means for connecting said sills to said bolster members in a plurality of positions transversely of the platform between maximum and minimum positions of spacement between said sill members, a tool compartment extending to the rear end of said sill members connected to the rearmost bolster members of the platform between said sill members and not connected to said sill members, said compartment having a rear door at least as wide as the maximum adjusted distance between said sill members, the width of said compartment being not greater than the minimum adjusted distance between said sill members, a transverse brace element at each corner of the platform connected to a sill member, means for connecting each said element to a bolster member in a plurality of positions transversely of the platform, and bracing means between said sill members comprising a rod extending between and through said sill members, a plurality of tubular spacing elements surrounding said rod between said sill members.

2. A truck body platform comprising, in combination, a pair of longitudinally extending sill members, a plurality of transversely extending bolster elements, means for adjustably connecting said elements and members comprising a transverse plate secured to each said member and a bracket secured to each said element seated on a said plate, said plate having elongated apertures and said bracket having apertures for receiving connecting bolts whereby said members and elements may be secured together with said members maximum and minimum distances apart, and a separately formed tool compartment extending to the rear end of said sill members having a width not greater than said minimum distance, positioned between said members but not connected thereto, secured to one or more of said elements, said compartment having a rear door at least as wide as said maximum distance.

EDWARD S. GRUMBACHE.

References Cited in the file of this patent

UNITED STATES PATENTS

| Number | Name | Date |
| --- | --- | --- |
| 213,408 | Frakes | Mar. 18, 1879 |
| 774,861 | Wenzelmann | Nov. 15, 1904 |
| 817,626 | Cranston | Apr. 10, 1906 |
| 1,320,131 | Gillespie | Oct. 28, 1919 |
| 1,322,887 | Field | Nov. 25, 1919 |
| 1,579,388 | Palmer | Apr. 6, 1926 |
| 1,726,398 | Limbocker | Aug. 27, 1929 |
| 1,727,609 | Kramer | Sept. 10, 1929 |
| 1,887,756 | Gurton et al. | Nov. 15, 1932 |
| 1,921,597 | Wolfe | Aug. 8, 1933 |
| 1,957,497 | Galanot | May 8, 1934 |
| 2,029,756 | Davis | Feb. 4, 1936 |
| 2,100,323 | Fitch | Nov. 30, 1937 |
| 2,158,234 | Griebsch | May 16, 1939 |
| 2,188,548 | Biszantz | Jan. 30, 1940 |

FOREIGN PATENTS

| Number | Country | Date |
| --- | --- | --- |
| 52,535 | Denmark | Jan. 4, 1937 |
| 501,724 | Great Britain | Mar. 3, 1939 |